United States Patent [19]
Jackson

[11] 3,888,730
[45] June 10, 1975

[54] NUCLEAR REACTORS

[75] Inventor: George Oliver Jackson, Timperley, England

[73] Assignee: United Kingdom Atomic Energy Authority, London, England

[22] Filed: Feb. 17, 1969

[21] Appl. No.: 799,832

[30] Foreign Application Priority Data
Feb. 23, 1968 United Kingdom ............ 9038/68

[52] U.S. Cl. .................. 176/38; 176/37; 176/40; 176/62; 176/65; 176/87
[51] Int. Cl. ............................................. G21c 1/02
[58] Field of Search ............ 176/87, 17, 18, 40, 52, 176/37, 38, 65, 62

[56] References Cited
UNITED STATES PATENTS

| | | | |
|---|---|---|---|
| 3,080,308 | 3/1963 | Dickinson | 176/65 X |
| 3,121,052 | 2/1964 | Peterson et al. | 176/52 |
| 3,197,376 | 7/1965 | Balent et al. | 176/18 |
| 3,296,085 | 1/1967 | Peck et al. | 176/40 X |
| 3,322,639 | 5/1967 | Davidson | 176/87 X |
| 3,344,032 | 9/1967 | Vendryes et al. | 176/40 X |
| 3,356,588 | 12/1967 | Beliaev | 176/87 |
| 3,372,092 | 5/1968 | Margen | 176/87 X |
| 3,400,046 | 9/1968 | Barker | 176/40 |
| 3,437,558 | 4/1969 | Gunson et al. | 176/30 X |
| 3,475,272 | 10/1969 | Fortescue et al. | 176/40 |
| 3,498,880 | 3/1970 | Gollion | 176/65 X |
| 3,503,849 | 3/1970 | Yevick et al. | 176/30 |

FOREIGN PATENTS OR APPLICATIONS 1,017,365   1/1966   United Kingdom.................. 176/87

Primary Examiner—Harvey E. Behrend
Attorney, Agent, or Firm—Larson, Taylor & Hinds

[57] ABSTRACT

In a liquid cooled nuclear reactor, the combination of a single-walled vessel containing liquid coolant in which the reactor core is submerged, and a containment structure, primarily of material for shielding against radioactivity, surrounding at least the liquid-containing part of said vessel with clearance therebetween and having that surface thereof which faces said vessel make compatible with said liquid, thereby providing a leak jacket for said vessel. Said structure is preferably a metal-lined concrete vault, and cooling means are provided for protecting the concrete against reaching a temperature at which damage would occur.

1 Claim, 2 Drawing Figures

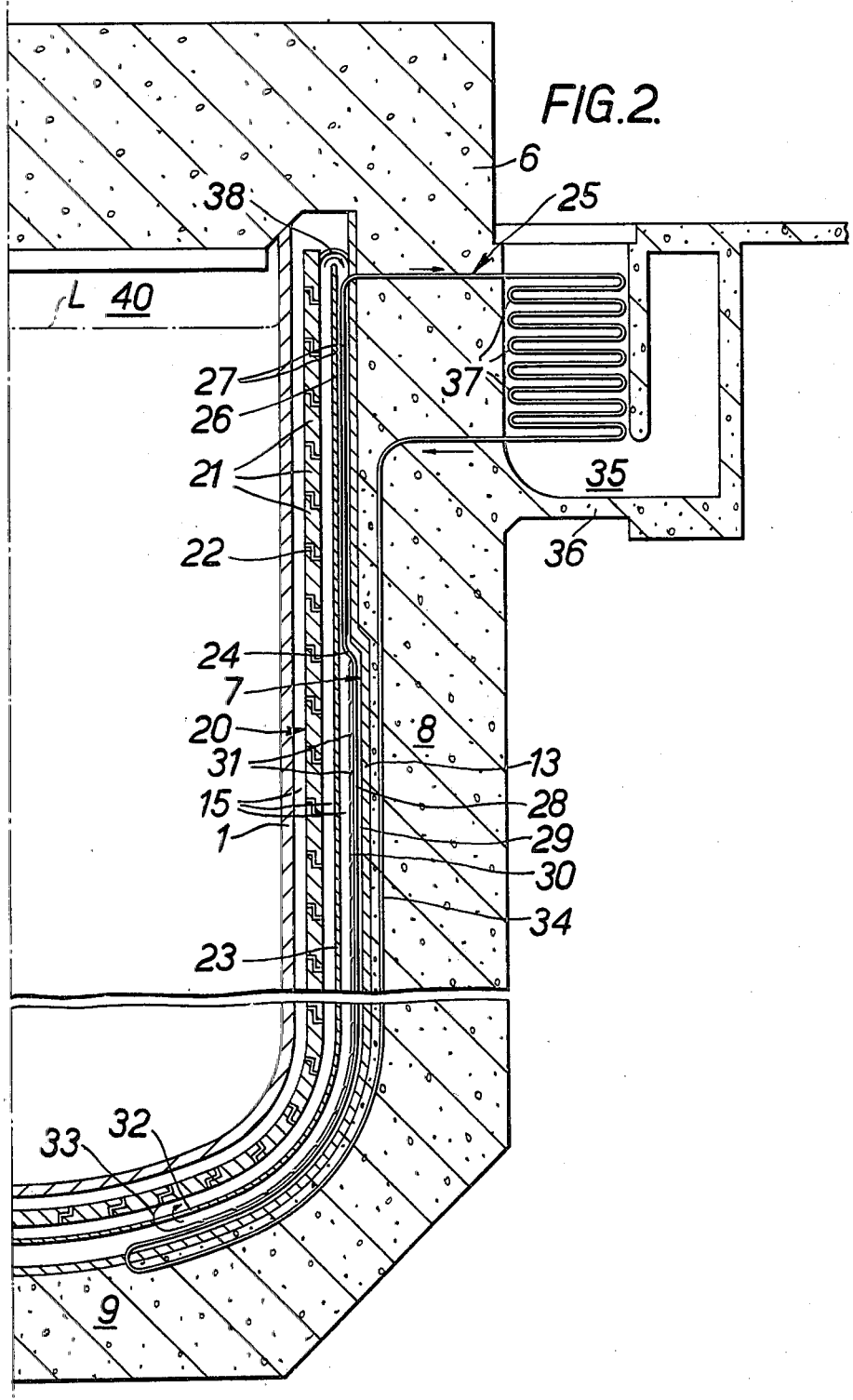

NUCLEAR REACTORS

BACKGROUND OF THE INVENTION

This invention relates to nuclear reactors, and in particular to that kind of nuclear reactor which employs liquid coolant which is contained in a vessel together with the reactor core.

One established practice for the construction of vessels for liquid coolant is the provision of double-walling so that if the inner wall of the vessel should leak, coolant will be trapped in the interspace between the vessels where its presence can be detected by suitable monitoring equipment indicating remotely. Furthermore, the liquid is prevented from escaping to regions where its radioactivity could give rise to a hazard, and can be collected at a drain point for re-use. The latter feature is important where the liquid is valuable, such as liquid metal or heavy water. However, the provision of an outer vessel, built to the same standards of leak tightness as the inner, liquid containing, vessel is expensive.

It is an object of the present invention to provide, making use of already existing structure, a liquid-containing system which has all the advantages of a double-walled vessel but which introduces capital cost savings.

SUMMARY OF THE INVENTION

According to the invention, a liquid metal cooled fast reactor, comprising a fast reactor core structure, a heat exchanger, and means for circulating a liquid coolant through the core structure and heat exchanger, is provided with a single wall open top coolant tank containing a pool of liquid metal coolant in which the core structure is submerged and the heat exchanger and circulating means are immersed. A concrete vault structure, comprising a wall part, a base part and a roof part, contains the single wall coolant tank and is spaced from the tank at the wall and base parts. A membrane lining is provided for the vault structure, and sealing means are incorporated between that part of the lining of the roof part and that part of the lining of the wall part of the vault structure. Means are provided for cooling at least the wall part of the vault structure. There is provided, in the space between the coolant tank and the membrane lining, in the following order outwardly from the tank, a heat insulation structure, a baffle, and pipe means conducting coolant fluid. The pipe means extend into the body of the vault structure to cool at least the wall part of the vault structure, and through the vault structure to a heat exchanging coil outside the vault structure and from the coil back to the space between the coolant tank and membrane lining. This space is filled with an inert gas, and means are provided for inducing convection/circulation of the gas.

DESCRIPTION OF THE DRAWINGS

Further features of the invention will become evident from the ensuing description of a constructional embodiment thereof given by way of example and illustrated in the accompanying drawings, wherein FIG. 2 is a fragmentary enlarged side view in section, providing more detail than, and modified compared with, FIG. 1.

DESCRIPTION OF PREFERRED EMBODIMENTS

Figure 1:
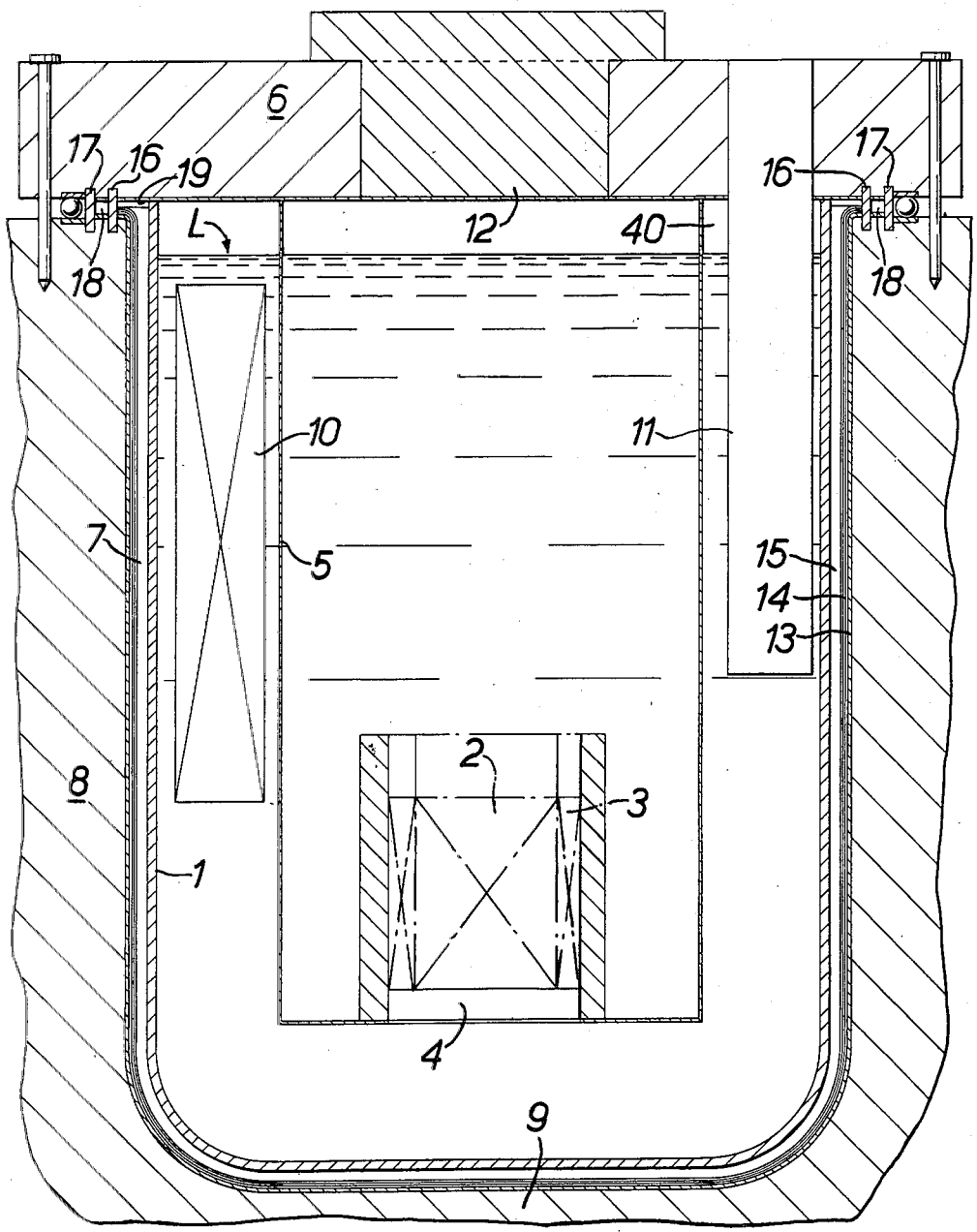
FIG. 1 is a diagrammatic side view in section of essential features of a liquid metal cooled fast breeder nuclear reactor.

Referring firstly to FIG. 1 of the drawings, there is illustrated diagrammatically a liquid metal cooled fast breeder nuclear reactor consisting essentially of a coolant tank 1 containing the reactor core 2 and radial breeder region 3 carried by a diagrid 4 which is supported by a core vessel 5, the tank 1 and core vessel 5 being suspended from a roof 6 which spans a vault 7 with a concrete wall 8 and base 9. The tank 1 contains liquid metal (e.g., sodium) to a level L, and a coolant circuit involving the core 2 and breeder region 3, one or more heat exchangers (one is shown in FIG. 1 designated 10) and one or more sodium pumps (one is shown in FIG. 1 designated 11), is submerged in the sodium pool in the vessel 1. The means for confining and guiding the flow of sodium between core and heat exchanger(s), heat exchanger(s) and pump(s), and pump(s) and core are not of significance to the invention and are omitted for the sake of clarity. The roof 6 carries a rotatable shield plug 12 coaxial with the core 2 and by means of which fuel loading and unloading can be performed by a suitable machine (not shown). The shield plug 12 also carries control mechanism (not shown) for varying the axial position of control elements relative to the core. Other necessary ancillary services such as fuel element and coolant temperature monitoring, fuel element failure detection, sodium level detection, flux plotting etc. are provided but as they too are irrelevant to this invention are not described.

Existing designs involving the herein described kind of nuclear reactor, for example the Prototype Fast Reactor (P.F.R.) now being constructed at Dounreay, Scotland, employ a double-walled vessel for containing the sodium pool, reactor core, core vessel, heat exchanger(s), pump(s), and other associated equipment. However, the present invention envisages a single-walled vessel 1 as illustrated, and employs the vault 7 as leak jacket, thus using the same basic design as hitherto but being able to obviate the need for the outer wall of the double-walled vessel, which saves expense. However, some adaptation of the existing structure is desirable, as will be subsequently described, but such adaptation is likely to prove appreciably less expensive than a second vessel built to the same exacting standards as the inner vessel of said existing designs.

It is desirable to provide the concrete wall 8 and base 9 of the vault 7 with a membrane lining 13 which can be of relatively inexpensive thin gauge mild steel since it is supported by the concrete. Also, since it is essential to avoid large temperature differences across a concrete structure if the integrity of the structure is to be preserved, it may be necessary to provide some thermal insulation, shown diagrammatically and designated 14, on the lining 13 to reduce the concrete surface temperature to below 80°C, which is recommended. However, the need or otherwise for thermal insulation will be dictated by several factors, such as the mean and peak temperatures of sodium at the inner surface of the tank 1, the thickness and material of tank 1, the emissivity of tank 1, the dimensions of the interspace 15 between tank 1 and the lining 13, the gas occupying said interspace (which will preferably be an inert gas being the same as the inert gas blanket 40 over the sodium pool in the vessel 1, e.g., argon), and finally the thickness of the lining 13, and it may well be, by suitable choice of those of the said parameters where a choice exists, that the use of thermal insulation, which is relatively expensive, can be avoided. As an alternative or in addition, where cooling needs to be provided, cooling pipes embedded in the concrete near to said lining 13, may be provided.

In order to provide against the escape of radioactive gas from the interspace 15 between the vessel 1 and lining 13, it is necessary to provide sealing means between the roof 6 and the vault 7. Such sealing means are indicated diagrammatically in the drawing, in which a main seal 16 and a back-up seal 17 are illustrated. Means for detecting the presence of radioactive blanket gas in the interspace 18 between the main seal 16 and back-up seal 17 is preferably provided, for indicating a leaking main seal 16.

A suitable drain (not shown) and a monitor for detection of the presence of sodium therein are provided at the lowest point of the vault 7, the monitor also giving warning of a sodium leak from vessel 1.

The undersides of roof 6 and shield 12 in contact with the interspaces 15 and 18 are provided with a thin mild steel lining 19.

Referring now to FIG. 2 (in which reference numerals designating like parts in FIG. 1 are employed) which illustrates a preferred construction in more detail and with some modifications compared with FIG. 1, the various factors and their relationship hereinbefore discussed with reference to the provision of thermal insulation and/or cooling are to be considered as necessitating both thermal insulation and cooling, and preferred expedients to this end will now be described. The interspace 15 between single-walled vessel 1 and the lining 13 of the vault 7 is occupied by, from the vessel 1 outwardly, a thermal insulation structure 20 consisting of lagging blocks 21 with staggered clearance joints 22 disposed parallel to and with clearance from vessel 1, a solid thick-walled baffle 23 also disposed parallel to vessel 1 and with clearance from structure 20, and one leg 24 of a cooling pipe circuit 25. The portion 26 of the leg 24 of the cooling pipe circuit which is in register with the upper region of vessel 1 is provided with longitudinal finning 27 (there being for example eight fins around the circumference of the cooling pipe constituting the portion 26), and in this region the portion 26 is disposed in a narrowed interspace between baffle 23 and lining 13 of vault 7. That portion 28 of the leg 24 which is in register with the middle and lower regions of the vessel 1 occupies a wider interspace between baffle 23 and lining 13 and is contained within a duct 29 formed by a thin-walled baffle 30 which is provided at frequent equally-spaced intervals with louvres 31. The solid baffle 23 has a port 32 below the base of vessel 1, and the thin-walled baffle 30 has a transverse closure 33 joining it to the structure 20 via the port 32, and there is an upper transverse closure 38 between structure 20 and lining 13.

The leg 24 of the cooling pipe circuit 25 penetrates the lining 13 at the base portion thereof and the other leg 34 of the circuit 25 is embedded within the concrete base 9 and wall 8 in proximity to the lining 13 to return parallel to lining 13 to a position in register with the upper region of vessel 1 before entering a cooling duct 35 in an extension 36 of the concrete wall 8, being there formed into coils 37 before penetrating the wall 8 and becoming leg 24. A flow of air through duct 35 and over coils 37 is induced by air circulating means (not shown). The cooling circuit 25 is filled with the sodium/potassium entectic alloy (NaK). The leg 34 is the 'cool' leg.

The wall 8 of the vault 7 is in this construction integral with the roof 6 of the vault 7, thus eliminating the need for sealing except around the periphery of a rotatable shield part (not shown) of roof 6.

The whole interspace 5 is filled with the same gas as the blanket 40 over the sodium in vessel 1, preferably argon. The gas forms a thermal insulating layer between vessel 1 and structure 20, and in addition, gas imperfectly confined by structure 20 can circulate upwardly between structure 20 and baffle 30 and downwardly firstly over the finned portion 26 of cooling pipe leg 24 and then both directly between baffle 23 and baffle 30, and over portion 28 of cooling pipe leg 24 as permitted by the louvres 31 in baffle 30. The staggered clearance joints 22 of structure 20 also permit cross-mixing of that gas volume which is in contact with vessel 1 and the circulating gas volume on the outward side of structure 20.

An example of suitable parameters for the described components for a vessel 1 of elliptial section, approximate dimensions 70 ft. across major axis, 38 ft. across minor axis, 44 ft. deep, normally operating at about 430°C, are:

| | |
|---|---|
| Width of gas space between vessel 1 and structure 20: | 6'' |
| Width of lagging blocks 21: | 9'' |
| Width of space between structure 20 and baffle 23: | 8'' |
| Width of baffle 23: | 3'' |
| Width of space between baffle 23 and baffle 30: | 8'' |
| Width of space between baffle 30 and lining 13: | 6'' |
| Width of space between baffle 23 and lining 13 (upper region only): | 6'' |
| Cooling pipe circuit 25: | I.D. 2'' O.D. 2⅜'' |
| Fins on portion 26 of pipe leg 24: | Width 1'' Thickness ⅛'' |

I claim:

1. A liquid metal cooled fast reactor comprising a fast reactor core structure, a heat exchanger, and means for circulating a liquid coolant through said core structure and heat exchanger, wherein there is provided a single wall open top coolant tank containing a pool of liquid metal coolant in which said core structure is submerged and said heat exchanger and circulating means are immersed, a concrete vault structure comprising a wall part and a base part and a roof part containing said single wall coolant tank and spaced from the tank at said wall and base part, a membrane lining for said vault structure, sealing means between that part of the lining of the roof part and that part of the lining of the wall part of the vault structure, and means for cooling at least the wall part of said vault structure, there being provided, in the space between the coolant tank and the membrane lining, in the following order outwardly from the tank, a heat insulation structure, a baffle, and pipe means conducting coolant fluid, said pipe means extending into the body of the vault structure to cool at least the wall part of the vault structure, and through the vault structure to a heat exchanging coil outside the vault structure and from said coil back to the space between the coolant tank and membrane lining, and wherein said space is filled with an inert gas, with means for inducing convection circulation of said gas.

* * * * *